United States Patent
Hama

(10) Patent No.: US 7,287,144 B2
(45) Date of Patent: Oct. 23, 2007

(54) HIT RATIO ESTIMATION DEVICE, HIT RATIO ESTIMATION METHOD, HIT RATIO ESTIMATION PROGRAM AND RECORDING MEDIUM

(75) Inventor: Toshiyuki Hama, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 458 days.

(21) Appl. No.: 10/970,857

(22) Filed: Oct. 20, 2004

(65) Prior Publication Data

US 2005/0108327 A1    May 19, 2005

(30) Foreign Application Priority Data

Nov. 17, 2003    (JP)    ............... 2003-386440

(51) Int. Cl.
*G06F 12/00*    (2006.01)

(52) U.S. Cl. .................. 711/188; 711/158; 711/133; 711/160; 711/170; 711/171; 718/102; 718/103; 718/104; 709/238; 709/239; 709/240; 709/241

(58) Field of Classification Search ................ 711/158, 711/118
See application file for complete search history.

(56) References Cited

U.S. PATENT DOCUMENTS

| | | | |
|---|---|---|---|
| 6,278,449 B1 * | 8/2001 | Sugiarto et al. ............ 715/826 |
| 6,546,473 B2 * | 4/2003 | Cherkasova et al. ........ 711/158 |
| 6,651,141 B2 * | 11/2003 | Adrangi ...................... 711/118 |
| 2003/0088739 A1 * | 5/2003 | Wilkes et al. ............... 711/133 |
| 2005/0071599 A1 * | 3/2005 | Modha et al. ............... 711/170 |

FOREIGN PATENT DOCUMENTS

| | | |
|---|---|---|
| JP | 5-225060 | 9/1993 |
| JP | 10-133902 | 5/1998 |
| JP | 2000-155713 | 6/2000 |
| JP | 2000-250809 | 9/2000 |

* cited by examiner

*Primary Examiner*—Sanjiv Shah
*Assistant Examiner*—Zhuo H. Li
(74) *Attorney, Agent, or Firm*—Gibb & Rahman, LLC

(57) ABSTRACT

Using a counter of the Web server 10, a leave probability p1, average value m and variance s2 of think time, and hit ratio r are calculated for a session data cache 12 involving a predetermined Web application. For a first reading of a group of reading plural session data proximate temporally, p1$a$, m$a$ and s2$a$, and average value $a$ of the number of data reading sessions in each group are defined. A computational expression setting means 21 sets a computational expression f($a$)=$a$ including p1, m, s2, r, p1$a$, m$a$ and s2$a$, the computational expression for a fix point computing method having a variable $a$. A true value searching means 22 searches an almost true value of $a$ by the fix point computing method based on the computational expression f($a$)=$a$. An estimation means 23 estimates r$a$ based on a searched value of $a$.

18 Claims, 14 Drawing Sheets

| Test case | Cache size | Hit ratio | Locality factor | Think time (sec) | Think time standard deviation (sec) | Leave probability (%) |
|---|---|---|---|---|---|---|
| Case 1 | 300 | 0.765 | 2.9 | 10.09 | 6.65 | 6.21 |
| Case 1 | 300 | 0.758 | 2.78 | 9.68 | 8.81 | 5.96 |
| Case 1 | 400 | 0.825 | 2.75 | 9.55 | 6.85 | 5.88 |
| Case 1 | 400 | 0.828 | 2.84 | 9.85 | 6.74 | 6.06 |
| Case 1 * | 500 | 0.945 | 4.15 | 14.43 | 0.71 | 8.89 |
| Case 1 | 500 | 0.929 | 2.18 | 7.57 | 7.23 | 4.66 |
| Case 2 | 150 | 0.754 | 2.74 | 8.86 | 6.03 | 6.1 |
| Case 2 | 200 | 0.81 | 2.46 | 7.96 | 6.31 | 5.48 |
| Case 2 * | 250 | 0.869 | 1 | 3.25 | 5.62 | 2.25 |
| Case 2 | 250 | 0.896 | 1.17 | 3.79 | 5.9 | 2.61 |
| Case 2 | | | | 10 | 5.74 | 6 |

[Figure 1]
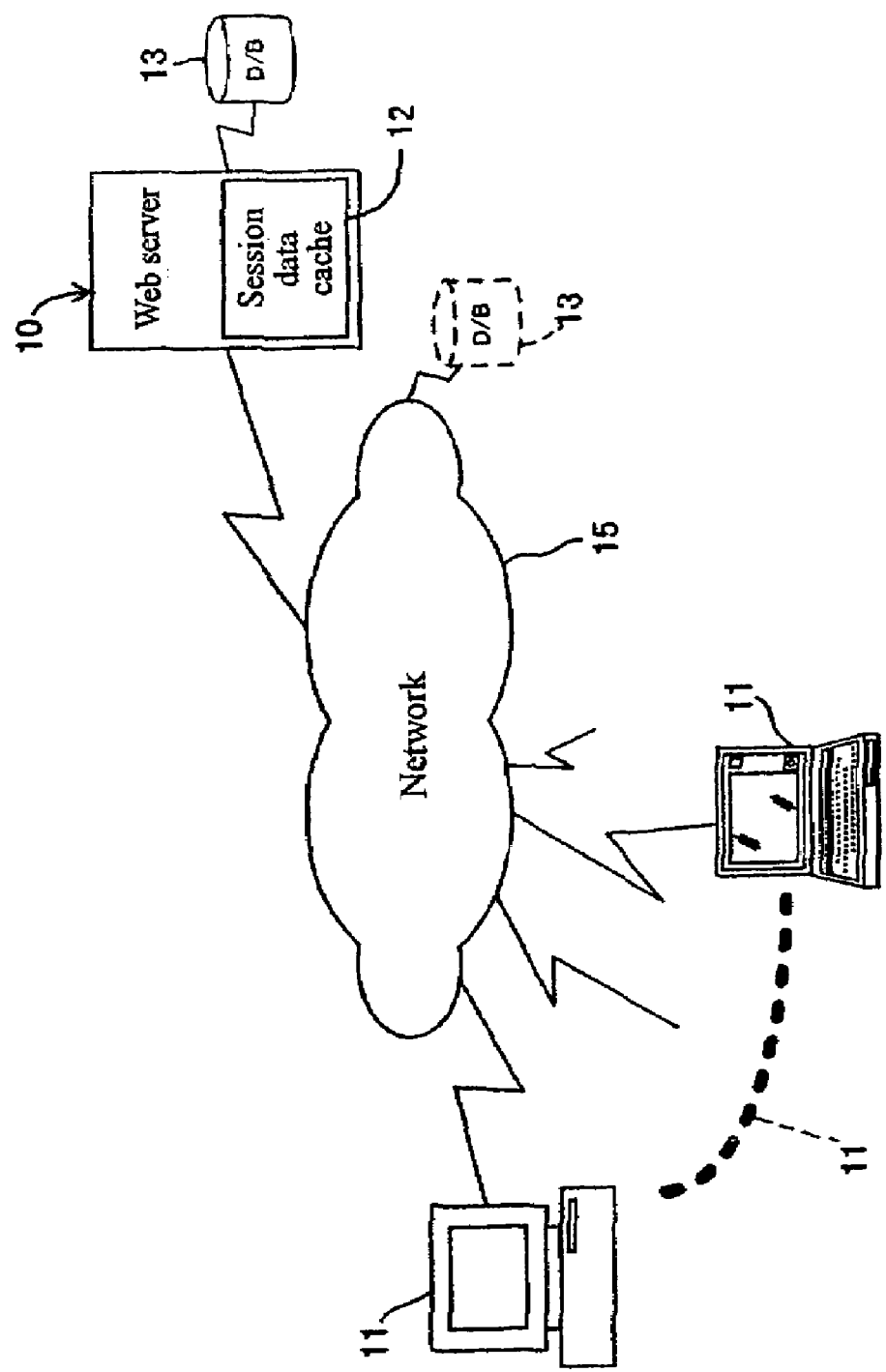

[Figure 2]
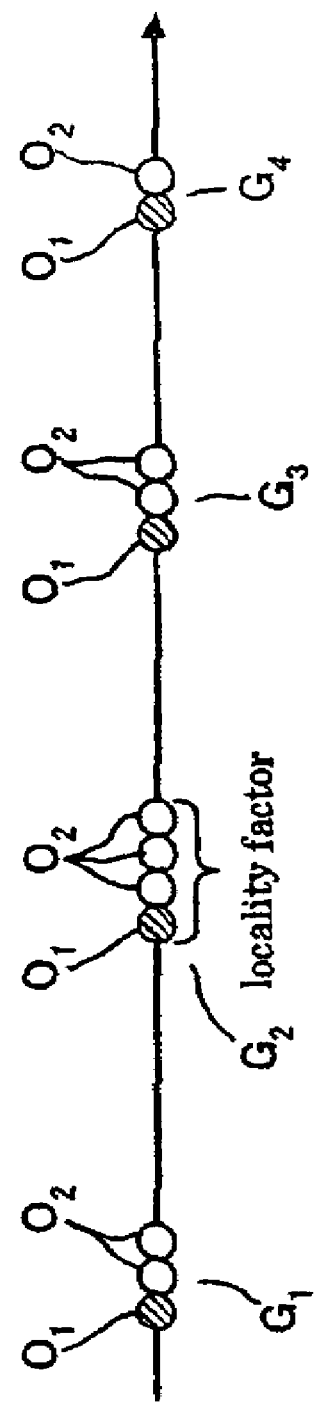

[Figure 3]
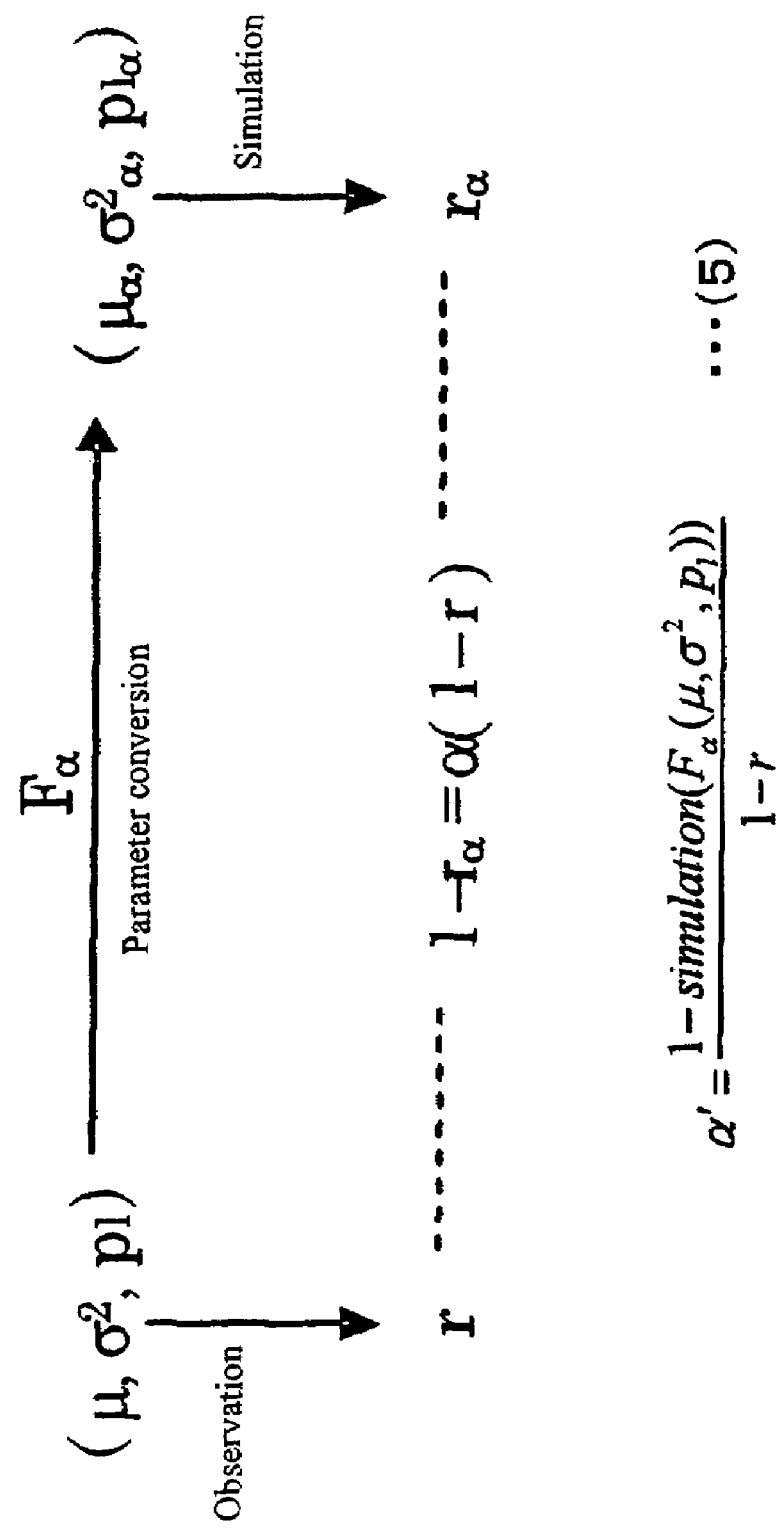

[Figure 4]
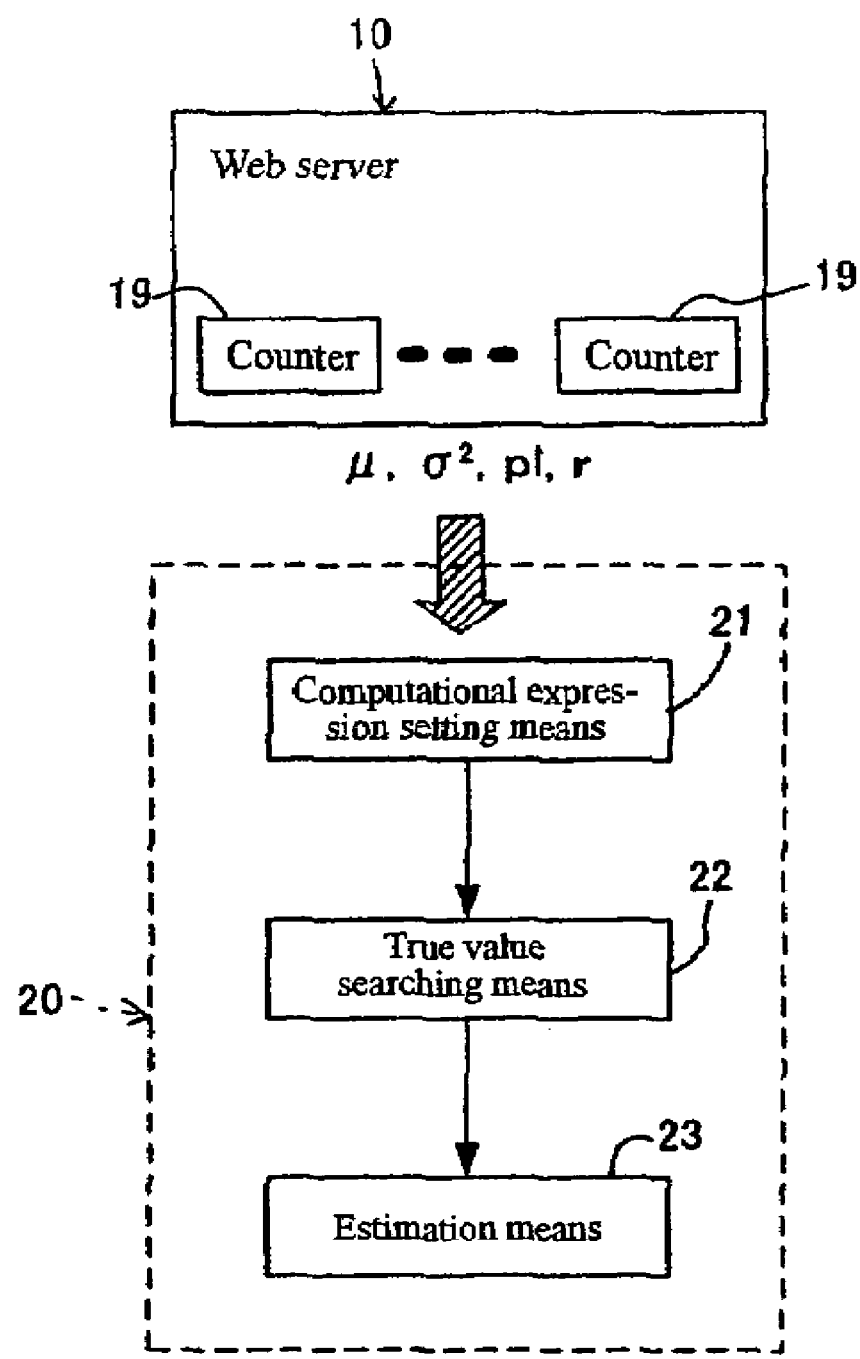

[Figure 5]
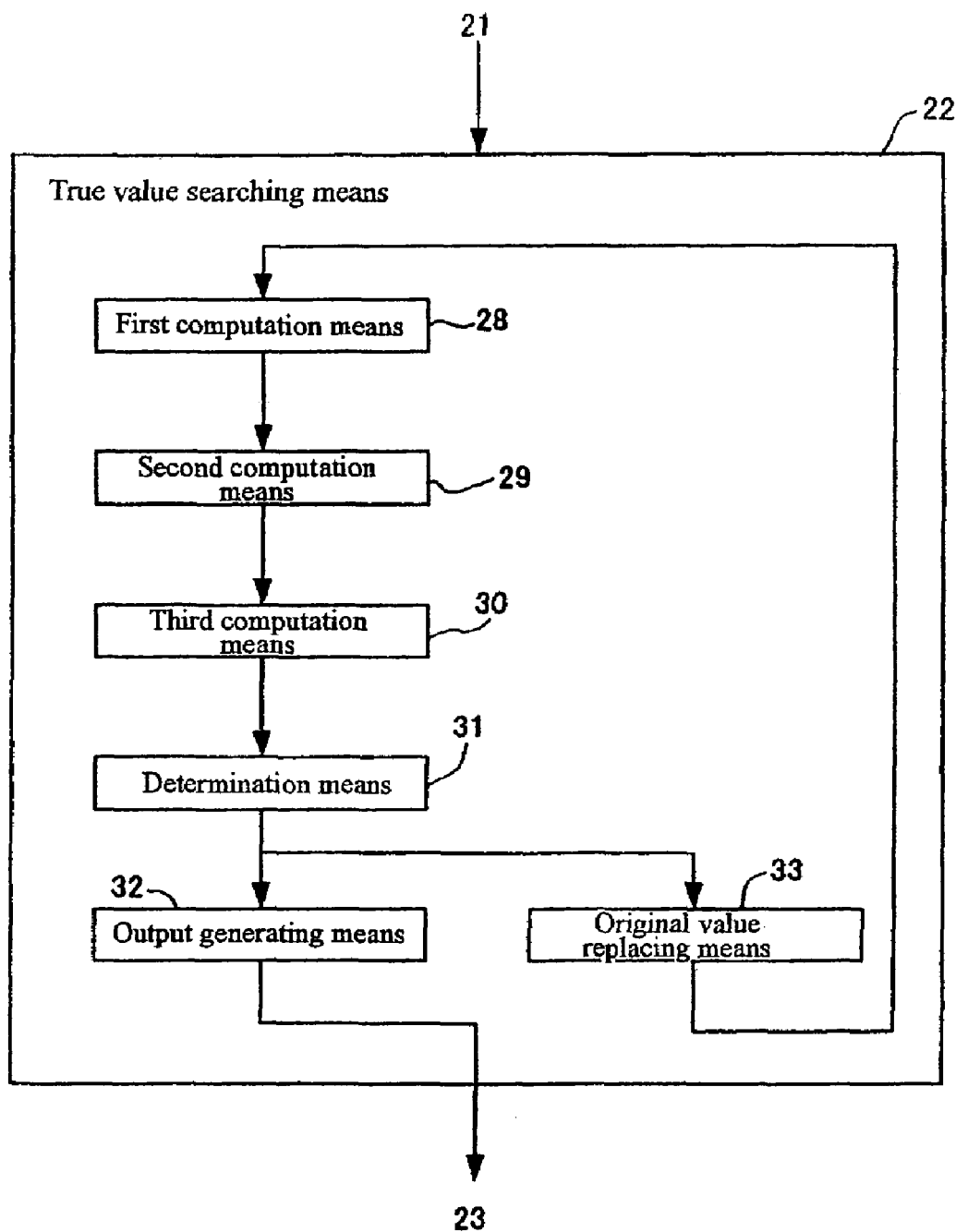

[Figure 6]
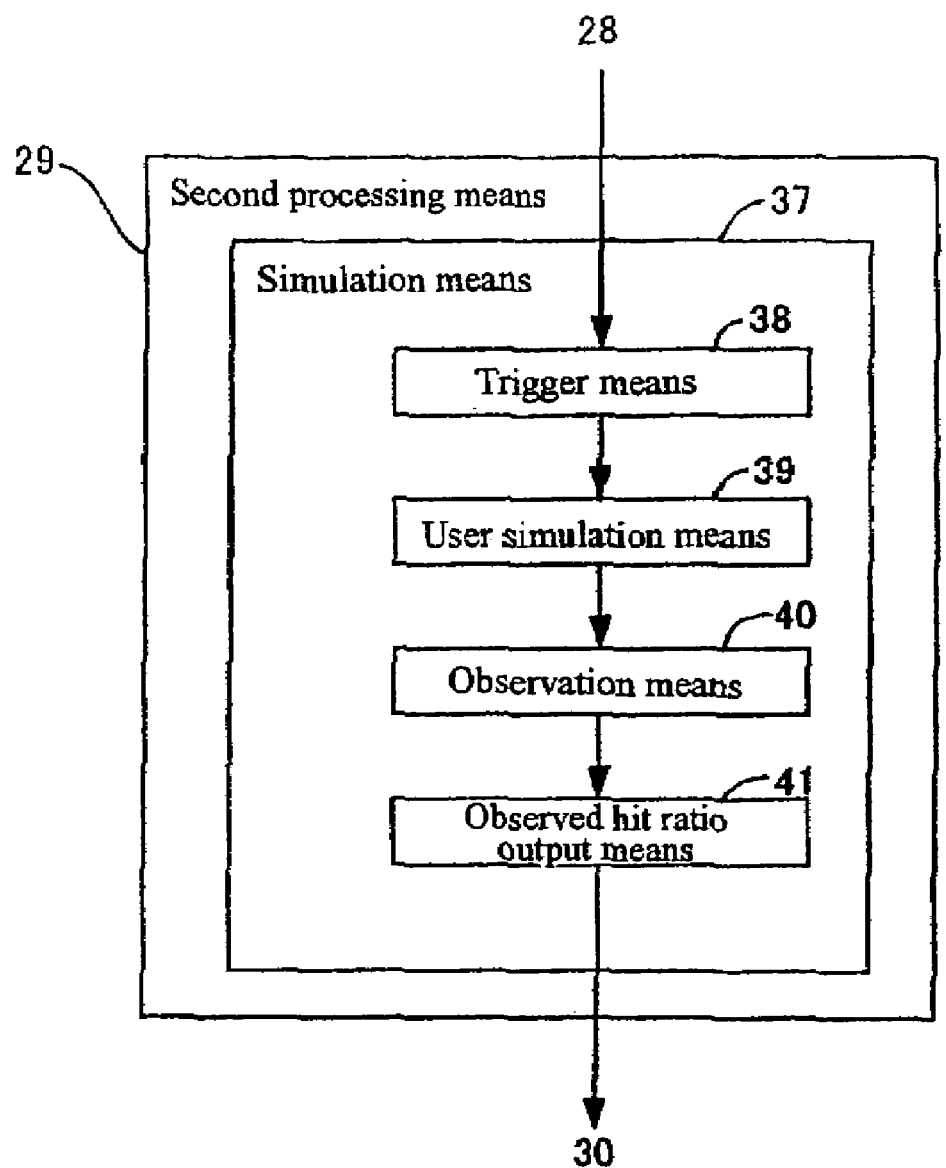

[Figure 7]
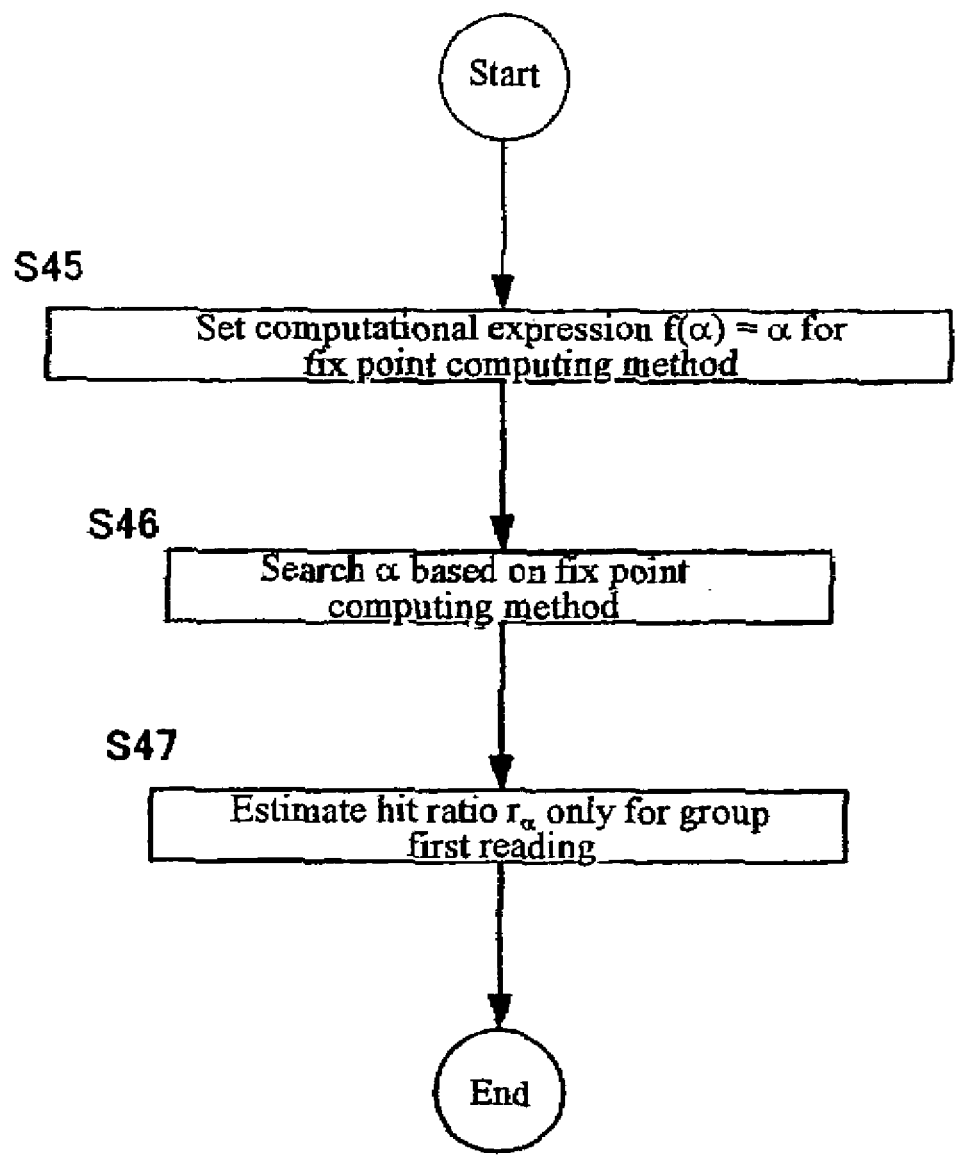

[Figure 8]
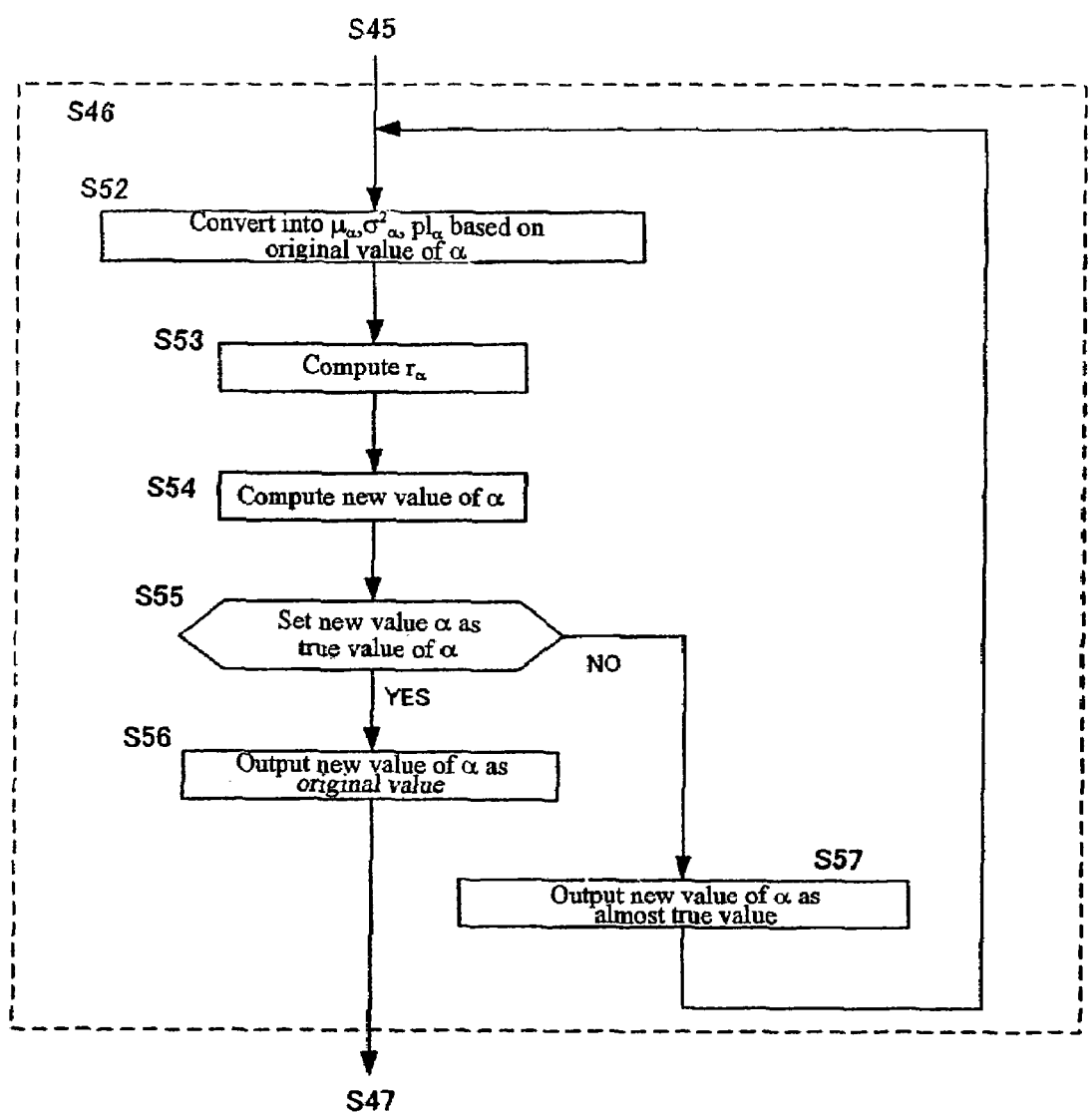

[Figure 9]
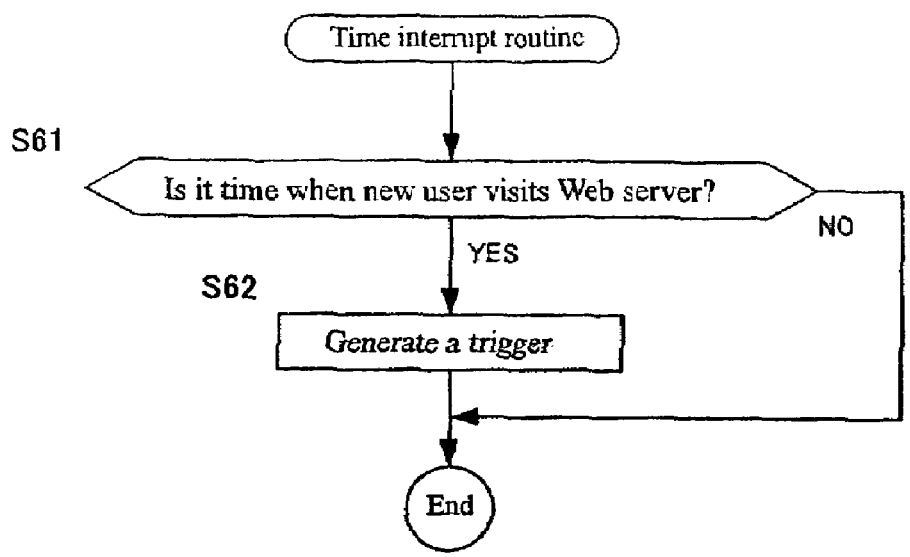
[Figure 10]
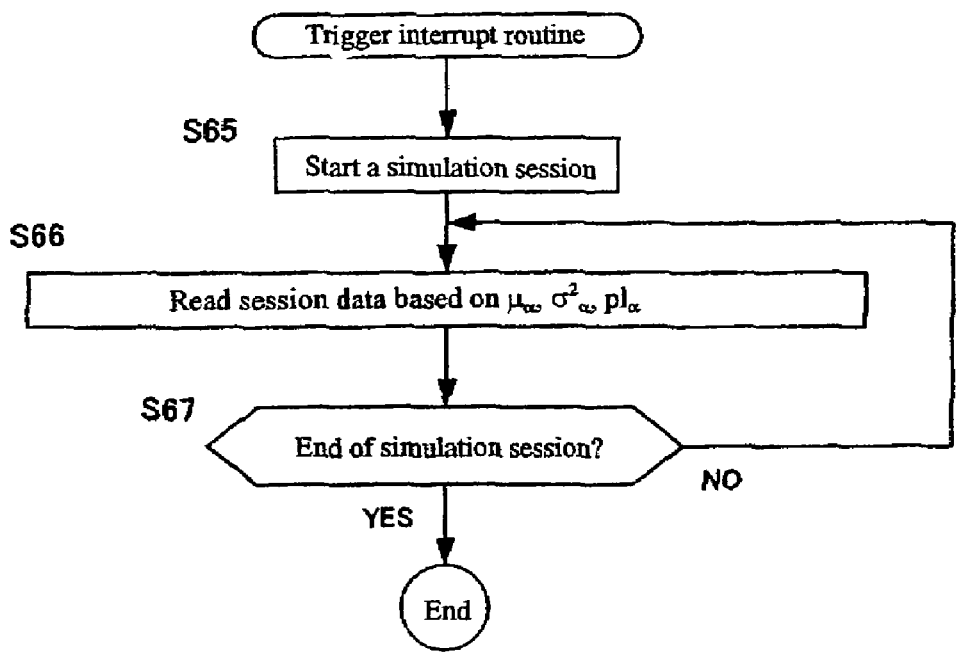

[Figure 11]
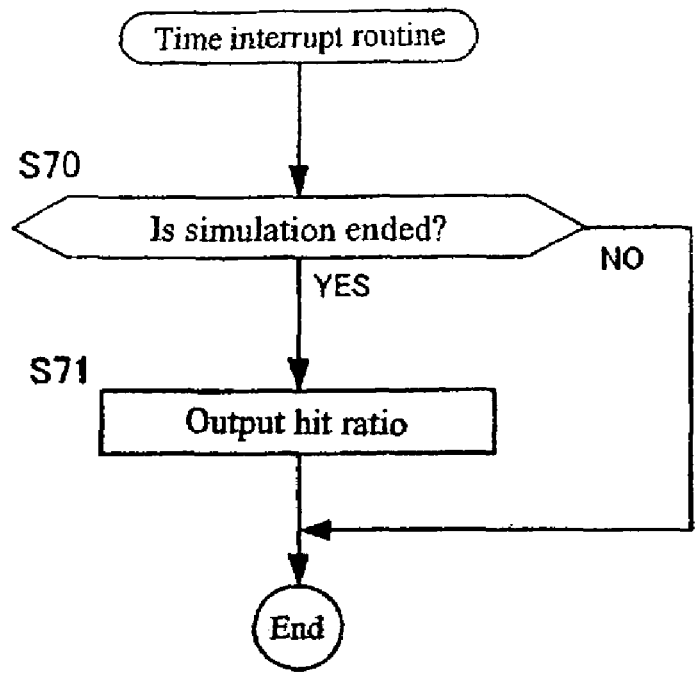
[Figure 12]
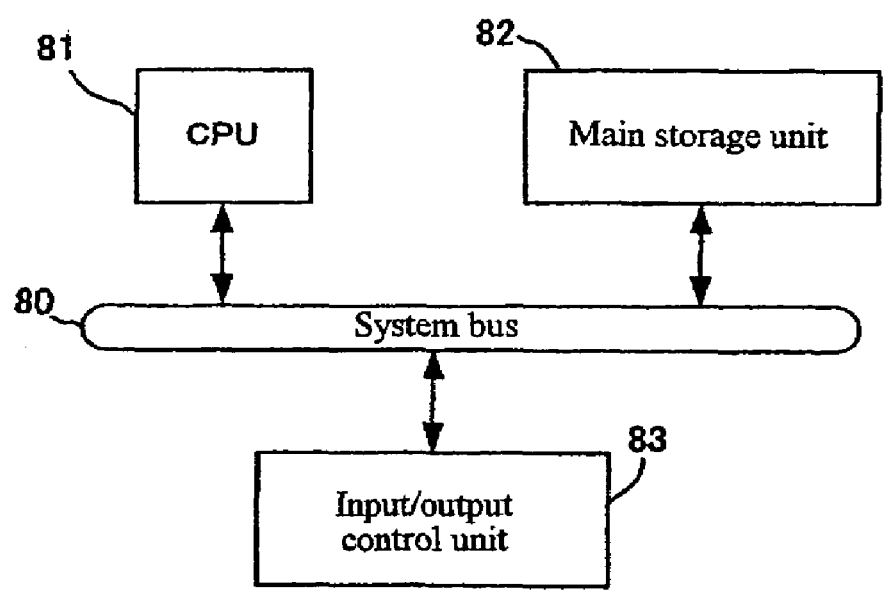

[Figure 13]
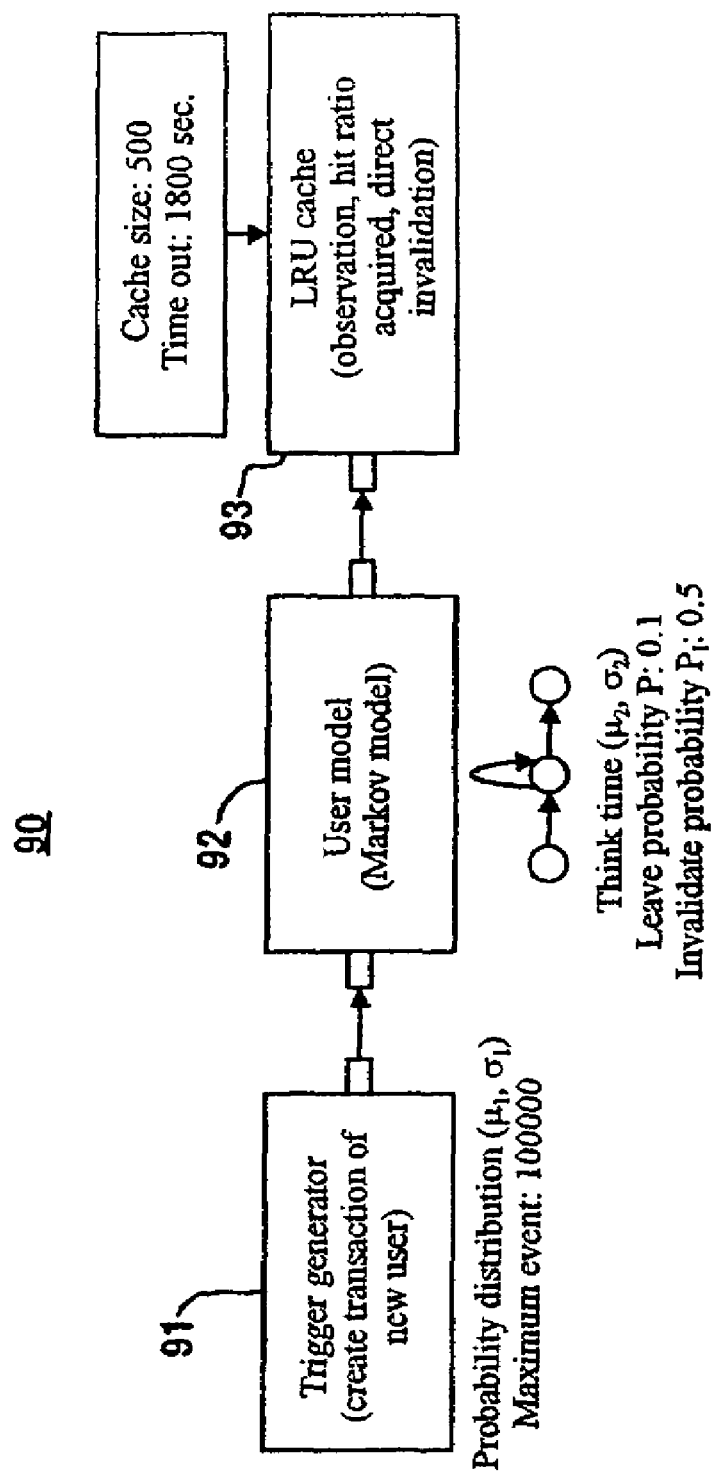

[Figure 14]
Test case 1
| Cache size | Hit ratio | Trigger interval (sec) | Leave proba-bility (%) | Invalidate proba-bility (%) | Think time (sec) | Think time standard deviation (sec) |
|---|---|---|---|---|---|---|
| 300 | 0.765 | 0.312 | 2.156 | 14.646 | 3.444 | 5.996 |
| 300 | 0.758 | 0.342 | 2.214 | 20.7 | 3.544 | 6.146 |
| 400 | 0.825 | 0.325 | 2.01 | 21.24 | 3.45 | 6.153 |
| 400 | 0.828 | 0.35 | 2.164 | 17.672 | 3.446 | 6.479 |
| 500 | 0.945 | 0.34 | 2.186 | 20.031 | 3.484 | 6.112 |
| 500 | 0.929 | 0.317 | 2.121 | 18.684 | 3.489 | 6.194 |
[Figure 15]
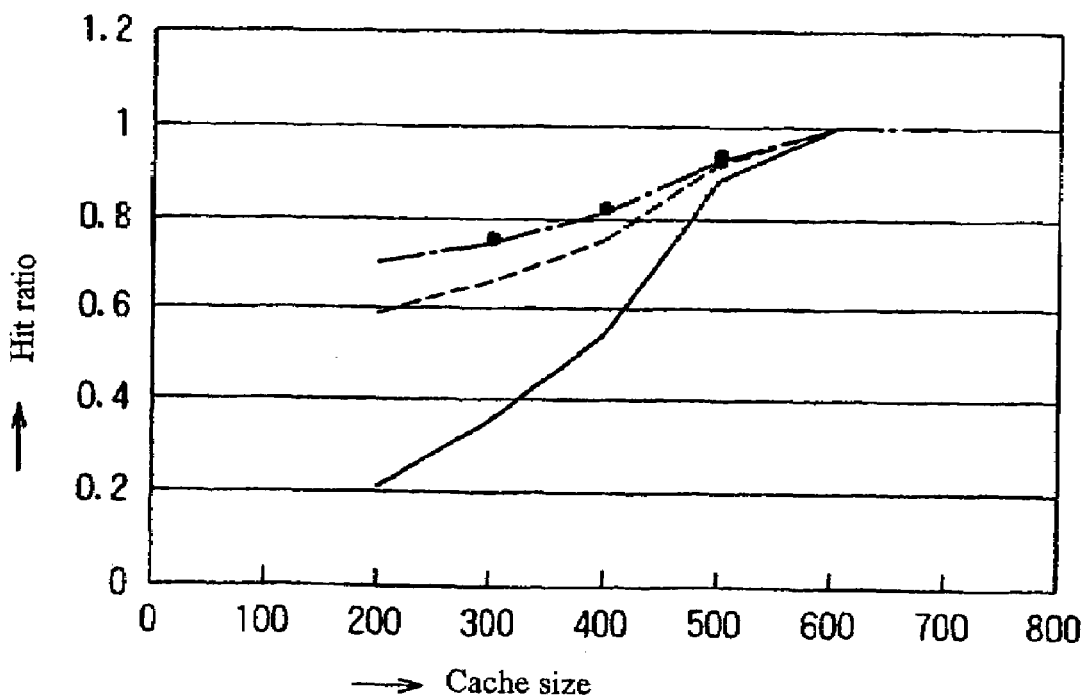

[Figure 16]
Test case 2
| Cache size | Hit ratio | Trigger interval (sec) | Leave probability (%) | Invalidate probability (%) | Think time (sec) | Think time standard deviation (sec) |
|---|---|---|---|---|---|---|
| 150 | 0.754 | 0.601 | 2.328 | 22.252 | 3.202 | 5.571 |
| 200 | 0.81 | 0.605 | 2.314 | 19.94 | 3.285 | 5.666 |
| 250 | 0.869 | 0.616 | 2.251 | 20.3 | 3.248 | 5.623 |
| 250 | 0.896 | 0.554 | 2.009 | 19.835 | 3.216 | 5.587 |
[Figure 17]
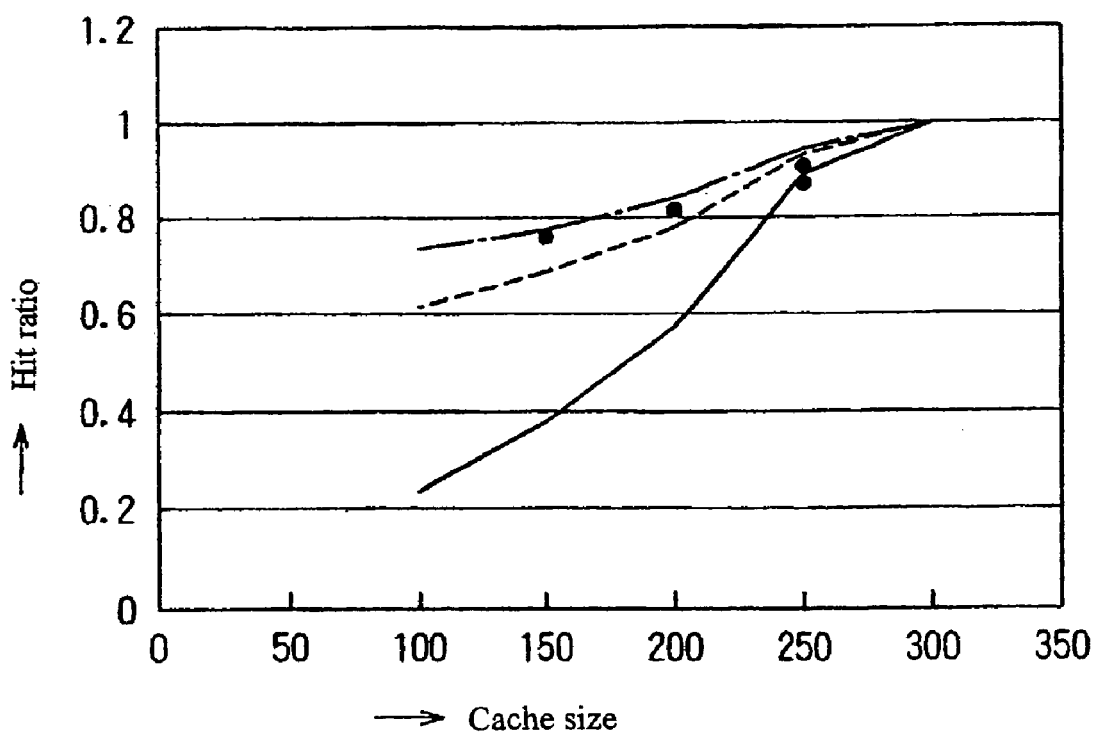

[Figure 18]

| Test case | Cache size | Hit ratio | Locality factor | Think time (sec) | Think time standard deviation (sec) | Leave probability (%) |
|---|---|---|---|---|---|---|
| Case 1 | 300 | 0.765 | 2.9 | 10.09 | 6.65 | 6.21 |
| Case 1 | 300 | 0.758 | 2.78 | 9.68 | 6.81 | 5.96 |
| Case 1 | 400 | 0.825 | 2.75 | 9.55 | 6.85 | 5.88 |
| Case 1 | 400 | 0.828 | 2.84 | 9.85 | 6.74 | 6.06 |
| Case 1 * | *500* | *0.945* | *4.15* | *14.43* | *0.71* | *8.89* |
| Case 1 | 500 | 0.929 | 2.18 | 7.57 | 7.23 | 4.66 |
| Case 2 | 150 | 0.754 | 2.74 | 8.86 | 6.03 | 6.1 |
| Case 2 | 200 | 0.81 | 2.46 | 7.96 | 6.31 | 5.48 |
| Case 2 * | *250* | *0.869* | *1* | *3.25* | *5.62* | *2.25* |
| Case 2 | 250 | 0.896 | 1.17 | 3.79 | 5.9 | 2.61 |
| Case 2 |  |  |  | 10 | 5.74 | 6 |

HIT RATIO ESTIMATION DEVICE, HIT RATIO ESTIMATION METHOD, HIT RATIO ESTIMATION PROGRAM AND RECORDING MEDIUM

FIELD OF THE INVENTION

The present invention relates to a hit ratio estimation device for estimating the information regarding a hit ratio of a cache upon a Web page transmission request from a client in a Web server with the cache, a hit ratio estimation method, a hit ratio estimation program and a recording medium, and more particularly to a hit ratio estimation device for estimating the information regarding a hit ratio of a cache upon a Web page transmission request while making a Web server active and suppressing the overhead, a hit ratio estimation method, a hit ratio estimation program and a recording medium.

BACKGROUND ART

In a Web server by IBM Corporation (Websphere Application Server, hereinafter referred to as an "IBM Web server"), a database, JMS (JavaÔ Message Service) server is defined as an external storage unit to provide data of HTTP session with permanence, and session data is read out through a session data cache prepared for each Web application. To enhance the performance of server, it is required to set the size of the session data cache for each Web application appropriately, but the optimal size is different with an arrival pattern of HTTP request for the Web application. Thus, it is desired that employing a statistical quantity (PMI Data Counter) regarding the performance held by the IBM Web server, the cache hit ratio is estimated when the cache size is changed, and the appropriate cache size is obtained. However, there is a locality in the reference or update pattern of HTTP session data, and if the statistical quantity of PMI (Performance Measurement infrastructure) data counter (PMI Data Counter) is directly employed, the actual hit ratio is undervalued, resulting in a problem of incorrect evaluation.

There is a long history of researching the method of evaluating the hit ratio of cache, in which various methods are provided from analytical to simulation method. An input arrival pattern is generated according to independent probability or a distribution in dependent relation to deal with the locality. However, the hit ratio in an actual system is evaluated or analyzed posteriori by acquiring detailed data. In the server system and the like, where it is practically impossible to acquire detailed data during actual operation due to overhead, those methods are difficult to apply.

A device of patent document 1 is concerned with a cache interposed between CPU and main storage but not the cache of server. In a computer of patent document 1, the cache system option (direct map/set associative) and the cache line size are settable to enable the application itself to maximize the hit ratio so that an application may know the hit ratio during execution of a job.

A device of patent document 2 is concerned with a cache of server, in which the empirical expression f(x) regarding the occurrence number includes a predetermined feature parameter, the size and entry number of session data actually employed in the total size of cache are recorded at regular intervals, the occurrence order x and the occurrence number f(x) corresponding to x are obtained based on the recorded data, the predetermined feature parameter is detected based on the obtained value of f(x), the cache hit ratio and the entry number S are estimated from the feature parameter, and an appropriate cache size is calculated based on the estimated cache hit ratio and entry number S.

A device of patent document 3 does not involve the cache of the server but involves the cache interposed between CPU and main storage. In the device of patent document 3, the block size of cache is virtually changed during execution of application, to calculate the hit number, and decide the size of data transfer based on the hit number, thereby improving the hit ratio of cache.

A device of patent document 4 does not involve the cache of the server but involves the cache interposed between CPU and main storage. In the patent document 4, it is disclosed that the total execution clock number for a program of evaluation object is obtained in consideration of the cache hit ratio.

Patent Document 1

Published Unexamined Patent Application No. 5-225060

Patent Document 2

Published Unexamined Patent Application No. 2000-155713

Patent Document 3

Published Unexamined Patent Application No. 2000-250809

Patent Document 4

Published Unexamined Patent Application No. 10-133902

PROBLEMS TO BE SOLVED BY THE INVENTION

In the IBM Web server, HTTP session data has such a permanence that even when one server is down in the cluster configuration, a session processed by one server is taken over by another server. Employing the database, JMS server defined as an external storage unit, each server makes reference or update of session data through a session data cache prepared for each Web application.

The session data has a paired set of attribute and value (e.g., user ID and its value). Reference is made to the attribute value, and the attribute value is updated. However, whether reference or update, it is firstly required that the session data is taken out, whereby the same operation is performed for the cache. That is, getSession( ) is a method for getting session data, in which it is a concern that the session data is hit in the cache at the time, but it does not matter for the cache whether the content of session data after extraction is referred to or updated.

To improve the performance of server, it is required to set the cache size to an appropriate value. However, since the optimal size is different with the arrival pattern of HTTP request to the Web application, the optimal size must be decided based on not only the structure of application but also the access pattern during operation.

If there is a detailed log for access pattern, the performance index such as cache hit ratio is relatively easily obtained through the simulation by analyzing the features, when the cache size is changed. Taking the detailed log during operation causes a large overhead and is virtually impossible. On the other hand, the IBM Web server has PMI that is defined as a data collection function of the performance index during operation, and holds various kinds of statistical amount (PMI Data Counter) with relatively small overhead (about 2% at the normal setting). If the cache hit ratio is accurately evaluated from this PMI data counter, the access pattern during operation is reflected and evaluated.

The statistical amounts regarding the PMI session include the number of reading the session data, and the average and variance of time intervals. However, reading the session data does not occur once for each HTTP request, but when one Servlet calls another Servlet or JSP, there is a possibility that session data reading may occur multiple times, the time interval being very short. Accordingly, the measured time interval contains a large deviation, and if the average value and variance held by the PMI are directly employed, the correct evaluation is difficult to attain. Furthermore, taking notice of a particular HTTP request, the number of reading depends on data, but the number of data reading sessions is often not known by analyzing the Servlet or JSP, except during execution.

Accordingly, it is intended to evaluate the performance index such as cache hit ratio regarding the session data as accurately as possible, employing the statistical amount with relatively small overhead such as the PMI data counter.

Though the devices of patent documents 1 and 3 detect the hit ratio or hit number, the hit ratio or hit number involves reading all the session data, in which when session data are read for multiple times one HTTP request, the hit ratio only for the first data reading session is not detectable while the overhead is suppressed.

The device of patent document 2 calculates the appropriate cache size, but the empirical expression regarding the occurrence number is defined as requisite, whereby it is difficult to apply it to the case where the hit ratio only for the first data reading session for each Web page transmission request is detected while the overhead is suppressed.

In patent document 4, the cache hit ratio is referred to, but it is no concern about how to detect the hit ratio only for the first data reading session for each HTTP request.

It is an object of this invention to provide a hit ratio estimation device, a hit ratio estimation method, a hit ratio estimation program and a recording medium in which information as to the hit ratio of cache regarding a predetermined Web application in a Web server in actual operation state is accurately estimated without increasing the overhead.

BRIEF DESCRIPTION OF THE DRAWINGS

FIG. 1 is a diagram showing the relationship between a predetermined Web server and plural clients that are connected over the network;

FIG. 2 is a diagram showing a temporal distribution of data reading sessions in one session;

FIG. 3 is an explanatory diagram showing that the hit ratio by parameter conversion and the hit ratio by observation are defined by a relational expression;

FIG. 4 is a functional block diagram showing a hit ratio estimation device;

FIG. 5 is a detailed functional block diagram showing true value searching means;

FIG. 6 is a detail functional block diagram showing simulation means;

FIG. 7 is a flowchart showing a hit ratio estimation method;

FIG. 8 is a detailed diagram of a searching step by a fix point computing method of FIG. 7;

FIG. 9 is a first specific flowchart showing a simulation step;

FIG. 10 is a second specific flowchart showing the simulation step;

FIG. 11 is a third specific flowchart showing the simulation step;

FIG. 12 is a hardware configuration diagram for executing the program;

FIG. 13 is a functional block diagram of a hit ratio estimation device mounted for the purpose of optimizing the size of a session cache in an IBM Web server in a cache configuration adviser project;

FIG. 14 is a table listing the parameters of a model computed from the measured values of PMI in a first experiment;

FIG. 15 is a graph showing the relationship between a hit ratio observed value in a first experiment and a hit ratio estimated by simulation based on the first experimental data;

FIG. 16 is a table showing the parameters of a model computed from the measured values of PMI in a second experiment;

FIG. 17 is a graph showing the relationship between a hit ratio observed value in the second experiment and a hit ratio estimated by simulation based on the second experimental data; and FIG. 18 is a table showing a locality factor estimated from the hit ratio observed value in the first and second experiments.

SUMMARY OF THE INVENTION

This invention provides a hit ratio estimation device for estimating a hit ratio in a session data cache, in which a Web server sets up said session data cache of preset size for each Web application, reads said session data from said session data cache or a permanent store, depending on whether a cache hit for session data in said session data cache or a cache miss, and refers to or updates an attribute value of read data. A leave probability as the reciprocal of an average value of the number of data reading sessions per session is defined as $p1$, the time interval of data reading sessions adjacent to each other in a time axis direction within the same session is called a think time, the average value and variance of the think time are defined as $m$ and $s2$, and the cache hit ratio for data reading sessions is defined as $r$. The Web server mounts one or more counters for counting predetermined count information capable of calculating $p1$, $m$, $s2$ and $r$. One or more data reading sessions corresponding to one Web page transmission request within the same session are called a group of data reading sessions, and a first data reading session among said group of data reading sessions is called a first reading session of the group of data reading sessions. The hit ratio estimation device estimates the hit ratio $ra$ in the cache only for the first reading session of the group of data reading sessions.

The hit ratio estimation device comprises computational expression setting means for setting a computational expression $f(a)=a$ ($a$ on the left side is a substituted for original value, and $a$ on the right is $a$ as new value obtained from the left side computation) including $p1$, $m$, $s2$, $r$, $p1a$, $ma$ and $s2a$, said computational expression for a fix point computing method having a variable $a$, in which the leave probability $p1a$, average value $ma$ of think time and variance $s2a$ of think time are defined only for the first reading session of the group of data reading sessions, and the average value of the number of data reading sessions included in the group of data reading sessions is defined as $a$, true value searching means for searching an almost true value of $a$ by the fix point computing method based on said computational expression $f(a)=a$, and estimation means for estimating $ra$ based on a searched value of $a$.

This invention provides a hit ratio estimation method for estimating a hit ratio in a session data cache, in which a Web server sets up said session data cache of preset size for each Web application, reads said session data from said session data cache or a permanent store, depending on whether a cache hit for session data in said session data cache or a cache miss, and refers to or updates an attribute value of read data. A leave probability as the reciprocal of an average value of the number of data reading sessions per session is defined as p1, the time interval of data reading sessions adjacent to each other in a time axis direction within the same session is called a think time, the average value and variance of the think time are defined as m and s2, and the cache hit ratio for data reading sessions is defined as r. The Web server mounts one or more counters for counting predetermined count information capable of calculating p1, m, s2 and r. One or more data reading sessions corresponding to one Web page transmission request within the same session are called a group of data reading sessions, and a first data reading session among said group of data reading sessions is called a first reading session of the group of data reading sessions. The hit ratio estimation method involves estimating the hit ratio ra in the cache only for the first reading session of the group of data reading sessions.

The hit ratio estimation method comprises a first step of setting a computational expression $f(a)=a$ (a on the left side is a substituted for original value, and a on the right is a as new value obtained from the left side computation) including p1, m, s2, r, p1a, ma and s2a, said computational expression for a fix point computing method having a variable a, in which the leave probability p1a, average value ma of think time and variance s2a of think time are defined only for the first reading session of the group of data reading sessions, and the average value of the number of data reading sessions included in the group of data reading sessions is defined as a, a second step of searching an almost true value of a by the fix point computing method based on said computational expression $f(a)=a$, and a third step of estimating ra based on a searched value of a.

The invention provides a hit ratio estimation program that is executed on a computer to perform each step of said hit ratio estimation method as described above and in the embodiments as hereinafter described. Or the hit ratio estimation program of the invention may enable the computer to operate as each means of the hit ratio estimation device as described above and in the embodiments. The invention provides a computer readable recording medium that records said hit ratio estimation program.

With this invention, the hit ratio only for the first reading session of the group of data reading sessions is introduced, and calculated by the fix point computing method, employing the computational expression $f(a)=a$ (a on the left side is a substituted for original value, and a on the right is a as new value obtained from the left side computation) including p1, m, s2, r, p1a, ma and s2a. Thereby, the precise hit ratio and the appropriate cache size can be detected for the Web application. And the counter for measuring the hit ratio for the first reading session of the group of data reading sessions is not installed, but the counter is capable of calculating the hit ratio for all the session data reading, whereby the overhead is reduced.

PREFERRED EMBODIMENT

FIG. 1 is a diagram showing the relationship between a predetermined Web server 10 and plural clients 11, 11, . . . that are connected over a network. This Web server 10 has internally a session data cache 12 assigned in a preset size for each Web application, and has a permanent store 13 consisting of a database and a JMS server, which is defined as an external storage. The Web server 10 accepts an HTTP request as a Web page transmission request from a plurality of clients 11, 11, . . . via the Internet 15, and transmits an HTML file as a Web page display file corresponding to the accepted HTTP request to the client 11, 11, having issued the HTTP request. The Web server 10 reads session data required for creation of the HTML file from a session data cache 12 as a general rule, and reads it from a permanent store 13 only when a cache miss occurs. The permanent store 13 may be connected via the Internet 15 to the Web server 10.

The locality of reading the HTTP session data occurs when a servlet calls another servlet, or JSP retrieves the output of another JSP to read session data in one HTTP request many times. On the other hand, a PMI data counter computes a statistical quantity by monitoring the session data that are defined as independently read session data. Thus, a parameter (a locality factor a as will be described later) representing this locality (how many times reference or update is consecutively called for one HTTP request) is introduced, and the statistical quantity of a PMI data counter (PMI Data Counter) is appropriately converted to obtain the hit ratio of correct cache. Also, because the locality factor is sometimes unknown except at the time of execution, the locality factor is estimated by a well-known fix point computing method, employing the current hit ratio obtained from the PMI data counter. In the fix point computing method, $f(x)=x$ is defined (x on the left side is original value, and x on the right side is new value calculated by this expression) and an approximate value of x is obtained.

FIG. 2 is a diagram showing a temporal distribution of session data read instruction (=execution of data reading sessions) in one session. The distribution of data reading sessions has locality. In one session, one or more session data readings are issued for one HTTP request as one Web page transmission request, plural session data readings corresponding to the same HTTP request have short time interval, temporally dense session data readings constitute group of data reading sessionss G1, G2, G3, . . . In FIG. 2, in each group of data reading sessions, the first data reading session is denoted by O1, and session data reading at the second time and beyond is denoted by O2. ag (number of O1+number of O2) in each group of data reading sessions G1, G2, G3, G4 is 3, 4, 3, 2.

The locality as seen in the reference or update pattern of session data (=pattern of session data read instruction=pattern for execution of data reading sessions) has a feature that a multiplicity of very short time intervals occurs in the time interval for which HTTP request arrives. In this session data reading pattern, since the session data always exists in the session data cache 12, regarding the session data reading O2 at the second time and beyond in a train of session data readings issued almost at the same time, the hit ratio is considered as 100%. Thus, the session data reading at the second time and beyond is temporarily ignored, and if the session data reading O1 at the first time, defined as the session data reading pattern, is only dealt with, it is possible to reduce excessive deviations in the temporal distribution considerably. Except for a cache replacement algorithm (Replacement Algorithm) employing the reference frequency (Least Frequently Used (LFU)), the IBM Web server in reality employs a simple Least Recently Used (LRU: Least Recently Used) method, whereby the hit ratio of the first data reading session O1 is not changed by ignoring the session data reading at the second time and beyond.

The average value of ag is defined a. In PMI, the statistical quantity including the session data reading O2 at the second time and beyond is held. However, to analyze the first data reading session O1 that is defined as object, it is required to translate the statistical quantity according to the locality factor. The time interval of the first data reading session O1 is equal to the time interval of HTTP request from one user, and called as a think time. Also, if the reciprocal of an average visit number at which the user visits the Web application in one session is defined as a leave probability, the following parameter conversion Fa is required by introducing the locality factor a. p1, m and s2 are leave probability, the average value and variance of the think time for reading all session data in one session, and p1a, ma and s2a are leave probability, the average value and variance of the think time for reading the first session data in one session.

$$ma = a \times m \quad (1)$$

$$s2a = a \times (s2 + m2) - m2\,a \quad (2)$$

$$p1a = a \times p1 \quad (3)$$

The cache hit ratio ra for the first data reading session O1 obtained by new parameter undergoing the parameter conversion Fa and the cache hit ratio r in consideration of all session data readings O1, O2 have the following relation.

$$1 - ra = a \times (1 - r) \quad (4)$$

From this relation, the cache hit ratio r including the session data readings O2 at the second time and beyond, which are temporarily ignored, can be computed. FIG. 3 is an explanatory diagram showing that the hit ratio ra by the parameter conversion Fa and the hit ratio by observation are defined by a relational expression. The relationship between the explanatory view of FIG. 3 and the fix point computing method will be described below. A procedure for computing new a by defining a function of a is considered, because a is obtained in the fix point computation. A function for obtaining ra clockwise from a left upper part is defined as simulation (Fa (m, s2, p1)). Employing the relational expression (4) from this and the observed value r, a' as new a is obtained by an expression (5) in FIG. 3. Regarding the left side as a function of a, an equation f(a)=a is solved with the fix point computing method to obtain a correctly.

From FIG. 3, when the locality factor is known, the hit ratio for any cache size is evaluated based on the locality factor. However, the locality factor may be decided only at the time of execution, in which if the locality factor is estimated by some method, the applicable range is extended.

Since the current hit ratio is known from the PMI data counter, the locality factor is estimated employing the current hit ratio. The new value of a is obtained from ra and r, employing the above relation, in which ra is computed from the initial value (e.g., 1) of appropriate locality factor a. This procedure is defined as procedure 1 below. The procedure 1 is repeated until the value of a converges, whereby the locality factor a is estimated.

(Procedure 1)

10: Set a, anew=1//start from 1.0

11: Do {

12: a=anew

13: Simulation ® ra

14: anew=(1−ra)/(1−ractual)

15: } while(|a−anew|>e)

FIG. 4 is a functional block diagram showing a hit ratio estimation device 20. The Web server 10 sets up a session data cache of preset size for each Web application, reading the session data from the session data cache and the permanent store 13, depending on whether a cache hit for session data in the session data cache or a cache miss, and referring to and updating an attribute value regarding read data. Herein, a leave probability that is a reciprocal of an average value of the number of data reading sessions per session is defined as p1, the time interval between session data reading adjacent to each other in a time axis direction within the same session is called a think time, the average value and variance of the think time are defined as m and s2, and the cache hit ratio for session data reading is defined as r. The Web server 10 has one or more counters for counting predetermined count information capable of calculating p1, m, s2 and r. One or more session data readings corresponding to one Web page transmission request within the same session are called a group of data reading sessions, and a first data reading session among the group of data reading sessions is called a first reading session of the group of data reading sessions. The hit ratio estimation device 20 estimates a hit ratio ra in the session data cache 12 only for the first reading session of the group of data reading sessions. The hit ratio estimation device 20 comprises computational expression setting means 21, true value searching means 22 and estimation means 23. A leave probability p1a, average value ma of think time and variance s2a of think time are defined only for the first reading session of the group of data reading sessions, and the average value of the number of data reading sessions included in the group of data reading sessions is defined as a. Computational expression setting means 21 sets a computational expression f(a)=a (a on the left side is a substituted for original value, and a on the right is a as new value obtained from the left side computation) including p1, m, s2, r, p1a, ma and s2a, the computational expression for a fix point computing method having variable a. True value searching means 22 searches an almost true value of a by the fix point computing method based on the computational expression f(a)=a. Estimation means 23 estimates ra based on searched value of a.

Though mounting the counter for directly observing the cache hit only for the first reading session of the group of data reading sessions increases the overhead, the hit ratio estimation device 20 simply mounts the counters for counting p1, m, s2, and r in reading all the session data, whereby the overhead is suppressed. Also, introduction of the locality factor a and searching for a with the computational expression f(a)=a for computation of fix point including p1, m, s2, r, p1a, ma and s2a allows for estimation of appropriate ra. Consequently, it is possible to obtain the session data cache 12 having an appropriate size involving the Web application in the Web server.

Referring to FIGS. 5 and 6, a specific form of the hit ratio estimation device 20 will be described below. The following individual specific constitution may be added to the hit ratio estimation device 20 of FIG. 4 in any combination.

FIG. 5 is a detailed functional block diagram showing the true value searching means 22. The computational expression f(a)=a set up by the computational expression setting means 21 is based on a first computational expression for converting p1, m, s2, into p1a, ma and s2a based on the original value of a, a second computational expression for computing the hit ratio ra only for the first calling based on into p1*a*, ma and s2*a* and a third computational expression for computing the new value of a from the relationship between hit ratio ra and observed value r. The true value searching means 22 comprises first computing means 28, second computing means 29, third computing means 30, determination means 31, output creating means 32 and original value replacing means 33. The first computing means 28 performs a computation based on the first computational expression upon input of original value of a. The second computing means 29 performs a computation based on the second computational expression upon inputs of p1*a*, ma and s2*a* from the first computing means 28. The third computing means 30 performs a computation based on the third computational expression upon input of ra from the second computing means 29. The determination means 31 determines whether or not the new value of a is recognized as the almost true value of a. The output creating means 32 creates the new value of a as output of the true value searching means 22, if the determination result is "positive". The original value replacing means 33 appends the new value of a as the original value of a to the first computing means 28, if the determination result is "negative".

The determination means 31 determines that the answer is "positive" if the absolute value of a difference between original value of a and new value of a is smaller than a predetermined value, and "negative" if the absolute value is greater than or equal to the predetermined value.

The first computing means 28 has the first original value of a as a preset initial value. The second computing means 29 comprises simulation means 37 (FIG. 6) for obtaining the new value of a by simulating the scheme of the session data cache in the Web server.

FIG. 6 is a detail functional block diagram showing the simulation means 37. The Web server 10 mounts one or more counters for counting count information capable of calculating a probability distribution (e.g., normal distribution N(m, s2)) for the time interval at which the user visits the Web server, and a probability PI at which the user notifies an explicit log-out to the Web server 10. The simulation means 37 comprises trigger means 38, user simulation means 39, observation means 40, and observation hit ratio output means 41. The trigger means 38 generates a trigger based on the time interval probability distribution. The user simulation means 39 simulates session data reading based on the probability distribution with ma and s2*a*, p1*a* and PI in each simulation session, the simulation session being started upon a trigger. The observation means 40 observes the cache hit for session data reading in the user simulation means. The observation hit ratio output means 41 outputs ra during simulation period based on observation of the observation means 40.

The user simulation means 39 defines the number of data reading sessions in each session with a Markov model.

FIG. 7 is a flowchart showing a hit ratio estimation method. At S45, leave probability p1*a*, average value ma of think time, and variance s2*a* of think time are defined only for the first reading session of the group of data reading sessions, and the average value of the number of data reading sessions included in the group of data reading sessions is defined as a. A computational expression f(a)=a (a on the left side is a substituted for original value, and a on the right is a as new value obtained from the left side computation) including p1, m, s2, r, p1*a*, ma and s2*a*, the computational expression being for a fix point computing method with variable a. At S46, an almost true value of a is searched by the fix point computing method based on the computational expression f(a)=a. At S47, ra is estimated based on search value of a.

Referring to FIG. 7, a specific form of the hit ratio estimation method will be described below. The following specific forms may be added in any combination, but by no means limit the invention.

FIG. 8 is a detailed flowchart showing step S46 by the fix point computing method of FIG. 7. The computational expression f(a)=a set up at S45 in FIG. 7 is based on a first computational expression for converting p1, m, s2 into p1*a*, ma and s2*a* based on the original value of a, a second computational expression for computing the hit ratio ra only for the first calling based on into p1*a*, ma and s2*a* and a third computational expression for computing the new value of a from the relationship between hit ratio ra and observed value r. In FIG. 8, S46 has S52 to S57. At S52, a computation is performed based on the first computational expression upon input of original value of a. At S53, a computation is performed based on the second computational expression upon inputs of p1*a*, ma and s2*a* from S52. At S54, a computation is performed based on the third computational expression upon input of ra from S53. At S55, it is determined whether or not the new value of a is recognized as the almost true value of a. If the determination result is "positive", the new value of a is made as output of S46 at S56. Also, if the determination result is "negative" at S55, the new value of a is made as the original value of a, and the operation returns to S52.

At S55, it is determined that the answer is "positive" if the absolute value of a difference between original value of a and new value of a is smaller than a predetermined value, and "negative" if the absolute value is greater than or equal to the predetermined value.

At S52, the first original value of a is a preset initial value. At S53, a simulation step (FIGS. 9 to 11) for calculating the new value of a by simulating the scheme of the session data cache in the Web server 10 is included.

The Web server mounts one or more counters for counting count information capable of calculating a time interval probability distribution for the time interval at which the user visits the Web server, and a probability PI at which the user notifies an explicit log-out to the Web server. FIGS. 9 to 11 are the specific flowcharts of simulation steps. The simulation steps are decomposed into three routines corresponding to FIGS. 9 to 11. Routines regarding flowcharts of FIGS. 9 and 11 are executed upon time interrupt. A routine regarding a flowchart of FIG. 10 is an interrupt routine executed upon occurrence of a predetermined trigger in FIG. 10.

In FIG. 9, at S61 and S62, a trigger is generated based on the time interval probability distribution (e.g., normal distribution N(m, s2)). That is, at S61, it is determined whether or not a trigger occurrence time occurs based on the time interval probability distribution. If the determination result is "positive", a trigger is generated at S62. This trigger causes the routine of FIG. 10 to be executed.

The routine of FIG. 10 is executed for each simulation session, and consequently executed by the number of sessions in the simulation over one simulation. The routine starts the simulation session based on the trigger, in which each simulation session simulates session data reading based on the probability distribution with ma and s2*a*, p1*a* and PI. That is, at S65, the simulation session is started upon the trigger. Each simulation session simulates session data reading based on the probability distribution with ma and s2*a*, p1*a* and PI. At S66, the session data reading in the corresponding simulation session is simulated. At S67, it is determined whether or not the corresponding simulation session is ended.

In a routine of FIG. 11, the hit ratio ra in simulation period is output based on the result of observing the cache hit in the session data reading in simulating the session data reading (S65 to S67). That is, at S70, it is determined whether or not the simulation at the present time is ended, based on whether or not the simulation time reaches a predetermined value, or the number of executing the simulation session reaches a predetermined value, for example. If the determination result is "positive", the hit ratio ra is output at S71.

At S66 involving the simulation of session data reading, the number of reading the session data in each session is defined with a Markov model.

This invention is implemented as hardware, software, or a combination thereof. In the combination of hardware and software, a predetermined program is executed in a computer system as a typical example. In such a case, the predetermined program is loaded into the computer system and executed to control the computer system to perform the processings of the invention. This program has groups of instructions that are representable in any language, code and notation. The groups of instructions are executed after the system performs a particular function directly, or one or both of 1) conversion into another language, code or notation and 2) copying into another medium. Of course, this invention covers not only the program itself, but also the medium recording the program in its scope. The program for performing the functions of the invention may be stored in any computer readable recording medium such as a flexible disk, MO, CD-ROM, DVD, hard disk unit, ROM, MRAM or RAM. This program may be downloaded from another computer connected via a communication line, or copied from another recording medium for storage into the recording medium. Also, this program may be compressed, or divided into plural pieces, and stored in a single recording medium or plural recording media.

FIG. 12 is a diagram showing the hardware configuration for executing the program. A hit ratio estimation program for executing each step (including a sub-step) of the hit ratio estimation method on the computer is executed, employing the hardware as shown in FIG. 12, for example. Alternatively, the program for enabling the computer to operate as each means of the hit ratio estimation device 20 is executed, employing the hardware as shown in FIG. 12, for example. In FIG. 12, a CPU 81, a main storage unit 82 and an input/output control unit 83 are connected to a system bus 80. The above means or step is executable as a coded program. The input/output control unit 83 comprises a hard disk interface, in which various kinds of programs executed by the CPU 81 are stored in the hard disk unit. The program is stored in the main storage unit 82, before execution in the CPU 81. The CPU 81 sequentially reads instruction lines from the main storage unit 82 to execute the program.

EXAMPLE 1

FIG. 13 is a functional block diagram of the hit ratio estimation device 90 mounted for the purpose of optimizing the size of a session cache in the IBM Web server in a cache configuration adviser (Cache Configuration Advisor) project. In this hit ratio estimation device 90, a session data reading pattern and an actual behavior of the cache are modeled, with a function of calculating the hit ratio with the cache size given by simulation defined as a nucleus. As shown in FIG. 13, the hit ratio estimation device has three components 91 to 93, in which the components 91 and 92 are parts for modeling the session data reading pattern, and a component 93 is a part for modeling the behavior of cache. The PMI data for deciding the parameters of the components 91 and 92 is employed.

Trigger generator 91 (Trigger): the time interval (trigger Rate) at which new user visits is defined with probability distribution. The probability distribution may be an exponential distribution (m1, s1), for example. In the trigger generator 91, the maximum event in one simulation is supposed to be 100,000.

User model (User Model) 92: the leave probability (leaveProbability) as the reciprocal of the number of referring to session data by one user (i.e., number of perusing the Web page) is defined with a simple Markov model, and the think time (thinkTime) as the time interval of reference is defined by a probability distribution (e.g., normal distribution (m2, s2)). Also, a probability (invalidateProb) of invalidating session data explicitly when leaving the Web site (corresponding to logout) is given. The invalidate probability is conditional probability, and indicates the rate of logging out explicitly when the user leaves the Web site, in which an invalidate set is completely included in a leaving set. Also, invalidating explicitly means pressing the link of logout (if any). In the case where the application is required to make a login such as bank online, there is the link of logout. However, since it is general that there is no link of logout, the user mostly goes to another Web site without invalidating explicitly. In the user model, it is supposed that the leave probability P is 0.1, and the invalidate probability PI is 0.5.

LRU cache (LRU Cache) 93: the cache for session data with LRU as replacement algorithm is modeled. In the LRU cache, it is supposed that the cache size is 500, and the time out is 1,800 seconds. The LRU cache and the cache size are given in the number of units as shown in FIGS. 14 to 18. The application server is mounted with JavaÒ (registered trademark), and the cache object is JavaÒ object. In JavaÒ, since the memory area can not be explicitly managed, the maximum number of cache objects is specified. Of course, the size of each object is not decided, whereby the total amount of consumed memory is indefinite. The estimated value of ra is output from the LRU cache.

In the IBM Web server Ver. 5.0 and beyond, the PMI data counter regarding the session is defined as the statistical amount in the following. A data counter (Data Counter) giving the average value internally holds the number of measurements, sum, square sum, maximum value and minimum value, whereby the variance is calculated. The left side of ":" is data counter name and the right side is counting data.

A. Data Counter Name: Counting Data createdSessions: number of created sessions invalidatedSessions: number of invalidated sessions sessionLifeTime: average life time of session activeSessions: number of concurrently active sessions. When the IBM Web server processes a request for using a session at present, the session is active.

liveSession: number of sessions put into cache of memory at the same time.

NoRoomForNewSession: only applicable to session with AllowOverflow=false specified within memory. Number of new session requests unprocessible because the maximum count number of sessions is exceeded.

cacheDiscards: number of session objects compulsorily removed from the cache (LRU removes the old entry and secures a space for new session and cache miss.) Only applicable to persistent session.

externalReadTime: time taken to read session data from the permanent store (milliseconds). In the plural line session, metric is for attribute, and in a single line session, metric is for whole session. Only applicable to persistent session. When JMS permanent store is employed, the user can select whether or not copied data is serialized. When the user selects not to serialize the data, the counter is not used.

externalReadSize: size of session data read from the permanent store. Only applicable to (serialized) persistent session. Same as externalReadTime.

externalWriteTime: time taken to write session data from the permanent store (milliseconds). Only applicable to (serialized) persistent session. Same as externalReadTime.

affinityBreaks: number of requests received in session accessed lastly from another Web application. This indicates a possibility of a fail over process or broken plug-in configuration.

serializableSessObjSize: size (bytes) of session (with serializable attribute) in memory. Only count session object including at least one serializable attribute object. Note that serializable attribute and unserializable attribute may be contained in one session. Size (bytes) is at the session level.

timeSinceLastActivated: time difference (milliseconds) in time stamp between previous access time and current access time. Session time out is not included.

InvalidatedViaTimeout: number of session requests in which CountStatistic does not exist possibly due to session time out.

attemptToActivateNotExistentSession: number of session requests not existent possibly due to session time out. This counter is usable to check whether the time out is too short or not.

The following amounts are available by employing the selected value from the PMI data counter. In the following, the rate of increase, mean, variance, count of measurement are represented by affixing Rate, Mean, Var and Count after the name of data counter B. Selected PMI Data Counter (Available Amounts)
- createdSessions (rate of increase)
- invalidatedSessions (rate of increase)
- sessionLifeTime (mean and variance)
- externalReadTime (count and mean)
- externalWriteTime (count and mean)
- timeSinceLastActivated (count, mean and variance)
- invalidatedViaTimeout (rate of increase)

Also, the following Configuration parameters for the Application Server can be acquired.

C. Configuration Parameter
- maxInMemorySessionCount: size of session cache
- sessionTimeout: time since last reference till invalidation
- writeInterval: time interval for asynchronous updating to external storage In the following item D, various kinds of statistical amounts (upper stage) are calculated in accordance with the computational expression (lower stage), based on the numerical values of A, B and C as above.

D. Statistical Amounts and Computational Expression
hitRatio: hit ratio

1−externalReadTimeCount/timeSinceLastActivatedCount
invalidateRate: explicitly invalidated frequency invalidatedSessionsRate−invalidatedViaTimeoutRate
timeoutRate: invalidated frequency by time out invalidatedViaTimeoutRate
totalRate: total invalidated frequency of above two amounts invalidatedSessionsRate
userLifetime: total time for which the user visits the Web site (sessionLifeTimeMean*totalRate−timeoutInterval*timeoutRate)/totalRate
userLifetimeVar: userLifetime variance ((sessionLifeTimeVar+sessionLifeTimeMean*sessionLifetimeMean)*totalRate−2*timeoutInterval*sessionLifeTimeMean*timeoutRate−timeoutInterval*timeoutInterval*timeoutRate)/totalRate
userLifetimeSD: userLifetime standard deviation sqrt(userLifetimeVar)
activeUser: average number of users visiting the Web site at a certain time userLifetime*createdSessionsRate
activeUserSD: variance of the number of users userLifetimeSD*createdSessionsRate
averageVisit: average number of times by which one user peruses the Web page userLifetime/timeSinceLastActivatedMean
Employing the major statistical amounts in item D, the simulation model is obtained in the following way.

E. Mathematical Amounts and Computational Expression for Use with Simulation Model
triggerRate: average time interval for which new session starts (new user arrives)

1/createdSessionRate
leaveProb: probability at which the user leaves the Web site 1/averageVisit
invalidateProb: probability at which session is invalidated explicitly when the user leaves the Web site invalidateRate/totalRate
userThinkTime: average time interval for which the user moves across the Web page timeSinceLastActivatedMean
userThinkTimeVar: time interval variance timeSinceLastActivatedVar
As will be apparent from the model definition, this model identifies an action of the user referring to the Web page with an action of the user referring to or updating session data. Accordingly, since it is not supposed that reference or update of session data occurs locally concentratively, there is a disparity between the hit ratio estimated by simulation and the actual hit ratio.

Using an application for bench mark called Trade3, two kinds of experiments for measuring the hit ratio in session cache (FIGS. 14 and 15 involve the first experiment (test case 1) and FIGS. 16 and 17 involve the second experiment (test case 2)) were performed, and the PMI data counter values were acquired for every 10 seconds with Tivoli Performance Monitor at the same time, whereby the hit ratio was obtained by simulation from the acquired values. FIGS. 11 and 13 are tables showing the model parameters computed from the measured values of PMI, and FIGS. 15 and 17 are graphs showing the hit ratio (polygonal line) estimated by simulation and the actually measured value (1 sign). The solid line, broken line and dashed line represent the hit ratio in simulation when the hit ratio is 1.0, 2.0 and 3.0. In FIG. 15, 1 is difficult to see as the values approach and overlap, but two exist at each cache size of 300, 400 and 500 (corresponding to the number of lines at each cache size in FIG. 14). In simulation, the hit ratio is evaluated, employing a few kinds of Locality factors (a=1.0, 2.0, 3.0). The case of a=1.0 corresponds to the hit ratio evaluated from statistical amounts of PMI without considering the locality of session data reading pattern. As will be apparent from the graphs of FIGS. 15 and 17, when the locality is not considered, there is a large disparity between the actually measured value and the estimated value. Accordingly, it is meaningful to consider the hit ratio in view of the locality in this invention.

A method for estimating the locality factor from the measured hit ratio r was verified. FIG. 18 is a table showing the results of estimating the locality factor employing the hit ratio obtained by the above experiment and the hit ratio by simulation. The think time and the leave probability after conversion are also listed with value a. From the experimental conditions, the correct values are attained such that the average think time is 10 seconds, the variance (SD) is 5.74, and the leave probability is 6%, and shown in the last line for comparison. Also, the test case with * affixed after test case name is that the repeated estimation was not converged and stopped beyond a permissible range of the locality factor in FIG. 18.

Since the hit ratio by simulation is not changed too much by changing the locality factor when the measured hit ratio is high, it is difficult to estimate the hit ratio when the measurement error and the model error are large, but when the hit ratio is small, the locality factor is estimated considerably correctly.

This invention involves the method for estimating the hit ratio of cache when the cache size is changed based on PMI as the data acquisition function mounted in the IBM Web server. The PMI collects the beneficial information within a range of relatively small overhead to acquire various kinds of statistical amounts from the active server. If the hit ratio is correctly evaluated from those information, the optimal cache size can be obtained at any time while the access pattern to the active server is being monitored online even when the access pattern is changed. Therefore, the system configuration regarding the HTTP session is optimized dynamically and adaptively.

DESCRIPTION OF SYMBOLS

10 . . . Web server
12 . . . Session data cache
13 . . . Permanent store
19 . . . Counter
20 . . . Hit ratio estimation device
21 . . . Computational expression setting means
22 . . . True value searching means
23 . . . Estimation means
28 . . . First computation means
29 . . . Second computation means
30 . . . Third computation means
31 . . . Determination means
32 . . . Output generating means
33 . . . Original value replacing means
37 . . . Simulation means
38 . . . Trigger means
39 . . . User simulation means
40 . . . Observation means
41 . . . Observation hit ratio output means

The invention claimed is:

1. A hit ratio estimation device for estimating a hit ratio in a session data cache, in which a Web server sets up said session data cache of preset size for each Web application, reads said session data from said session data cache or a permanent store, depending on whether a cache hit for session data in said session data cache or a cache miss, and refers to or updates an attribute value of read data;

wherein, a leave probability as the reciprocal of an average value of the number of data reading sessions per session is defined as p1, the time interval of data reading sessions adjacent to each other in a time axis direction within the same session is called a think time, the average value and variance of the think time are defined as m and s2, and the cache hit ratio for data reading sessions is defined as r;

wherein, said Web server mounts one or more counters for counting predetermined count information capable of calculating p1, m, s2 and r;

wherein, one or more data reading sessions corresponding to one Web page transmission request within the same session are called a group of data reading sessions, and a first data reading session among said group of data reading sessions is called a first reading session of the group of data reading sessions, said hit ratio estimation device estimating the hit ratio ra in said session data cache only for the first reading session of said group of data reading sessions, said hit ratio estimation device comprising:

a computational expression setting component adapted to set a computational expression f(a)=a (a on the left side is a substituted for original value, and a on the right is a as new value obtained from the left side computation) including p1, m, s2, r, p1a, ma and s2a, said computational expression for a fix point computing method having a variable a, in which the leave probability p1a, average value ma of think time and variance s2a of think time are defined only for the first reading session of said group of data reading sessions, and the average value of the number of data reading sessions included in the group of data reading sessions is defined as a;

a true value searching component adapted to search an almost true value of a by the fix point computing method based on said computational expression f(a)=a; and a estimation component adapted to estimate ra based on a searched value of a.

2. The hit ratio estimation device according to claim 1, wherein said computational expression f(a)=a set up by said computational expression setting component is based on a first computational expression for converting p1, m and s2 into p1a, ma and s2a based on the original value of a, a second computational expression for computing the hit ratio ra only for the first reading session of said group of data reading sessions, based on p1a, ma and s2a, and a third computational expression for computing the new value of a from the relationship between hit ratio ra and observed ratio r, and said true value searching component comprises a first computing component adapted to perform a computation based on said first computational expression upon input of original value of a, a second computing component adapted to perform a computation based on said second computational expression upon inputs of p1a, ma and s2a from said first computing component, a third computing component adapted to perform a computation based on said third computational expression upon input of ra from said second computing component, a determination component adapted to determine whether or not the new value of a is recognized as the almost true value of a, an output creating component adapted to create the new value of a as output of said true value searching component, if the determination result is "positive", and an original value replacing component adapted to replace the new value of a as the original value of a to said first computing component, if the determination result is "negative".

3. The hit ratio estimation device according to claim 2, wherein said determination component determines that the determination result is "positive" if the absolute value of a difference between original value of a and new value of a is smaller than a predetermined value, and "negative" if said absolute value is greater than or equal to said predetermined value.

4. The hit ratio estimation device according to claim 2, wherein said first computing component has the first original value of a as a preset initial value, and said second computing component comprises a simulation component adapted to calculate the new value of a by simulating a scheme of the session data cache in said Web server.

5. The hit ratio estimation device according to claim 4, wherein wherein, said Web server mounts one or more counters for counting count information capable of calculating a time interval probability distribution for the time interval at which the user visits said Web server, and a probability PI at which the user notifies an explicit log-out to said Web server, and said simulation component comprises a trigger component adapted to generate a trigger based on said time interval probability distribution, a user simulation component adapted to simulate session data reading based on the probability distribution with ma and s2a, p1a and PI in each simulation session, said simulation session being started upon a trigger, an observation component adapted to observe the cache hit for session data reading in said user simulation component, and an observed hit ratio output component adapted to output hit ratio ra during a simulation period based on observation of said observation component.

6. The hit ratio estimation device according to claim 5, wherein said user simulation component defines the number of data reading sessions in each session with a Markov model.

7. A hit ratio estimation method for estimating a hit ratio in a session data cache, in which a Web server sets up said session data cache of preset size for each Web application, reads said session data from said session data cache or a permanent store, depending on whether a cache hit for session data in said session data cache or a cache miss, and refers to or updates an attribute value of read data;

wherein, a leave probability as the reciprocal of an average value of the number of data reading sessions per session is defined as p1, the time interval of data reading sessions adjacent to each other in a time axis direction within the same session is called a think time, the average value and variance of the think time are defined as m and s2, and the cache hit ratio for data reading sessions is defined as r;

wherein, said Web server mounts one or more counters for counting predetermined count information capable of calculating p1, m, s2 and r;

wherein, one or more data reading sessions corresponding to one Web page transmission request within the same session are called a group of data reading sessions, and a first data reading session among said group of data reading sessions is called a first reading session of said group of data reading sessions, said hit ratio estimation method estimating the hit ratio ra in said session data cache only for the first reading session of said group of data reading sessions, said hit ratio estimation method comprising:

a first step of setting a computational expression f(a)=a (a on the left side is a substituted for original value, and a on the right is a as new value obtained from the left side computation) including p1, m, s2, r, p1a, ma and s2a, said computational expression for a fix point computing method having a variable a, in which the leave probability p1a, average value ma of think time and variance s2a of think time are defined only for the first reading session of said group of data reading sessions, and the average value of the number of data reading sessions included in the group of data reading sessions is defined as a;

a second step of searching an almost true value of a by the fix point computing method based on said computational expression f(a)=a; and a third step of estimating ra based on a searched value of a; and outputting said ra to a user.

8. The hit ratio estimation method according to claim 7, wherein said computational expression f(a)=a set up at said first step is based on a first computational expression for convening p1, m and s2 into p1a, ma and s2a based on the original value of a, a second computational expression for computing the hit ratio ra only for the first reading session of said group of data reading sessions, based on p1a, ma and s2a, and a third computational expression for computing the new value of a from the relationship between hit ratio ra and observed ratio r, and said second step comprises a first sub-step of performing a computation based on said first computational expression upon input of original value of a, a second sub-step of performing a computation based on said second computational expression upon inputs of p1a, ma and s2a from said first sub-step, a third sub-step of performing a computation based on said third computational expression upon input of ra from said second sub-step, a fourth sub-step of determining whether or not the new value of a is recognized as the almost true value of a, a fifth sub-step of creating the new value of a as output of said second step, if the determination result is "positive", and a sixth sub-step of replacing the new value of a as the original value of a to said first sub-step, if the determination result is "negative".

9. The hit ratio estimation method according to claim 8, wherein said fourth sub-step comprises determining that the determination result is "positive" if the absolute value of a difference between original value of a and new value of a is smaller than a predetermined value, and "negative" if said absolute value is greater than or equal to said predetermined value.

10. The hit ratio estimation method according to claim 8, wherein said first sub-step has the first original value of a as a preset initial value, and said second sub-step comprises a simulation step for calculating the new value of a by simulating a scheme of the session data cache in said Web server.

11. The hit ratio estimation method according to claim 10, wherein said Web server mounts one or more counters for counting count information capable of calculating a time interval probability distribution for the time interval at which the user visits said Web server, and a probability PI at which the user notifies an explicit log-out to said Web server, and said simulation step comprises a sub-step of generating a trigger based on said time interval probability distribution, a sub-step of simulating session data reading based on the probability distribution with ma and s2a, p1a and PI in each simulation session, said simulation session being started upon a trigger, and a sub-step of outputting hit ratio ra during a simulation period based on the result of observing the cache hit for session data reading in simulating the session data reading.

12. The hit ratio estimation method according to claim 11, wherein said sub-step of simulating the session data reading comprises defining the number of data reading sessions in each session with a Markov model.

13. A hit ratio estimation program stored on a computer readable storage medium that is executed on a computer to perform each step of said hit ratio estimation method according to claim 12.

14. A method for estimating a hit ratio in a session data cache, said method comprising:
performing a simulation to produce a simulated hit ratio (ra) of a first data reading session among a group of data reading sessions corresponding to one Web page transmission request, wherein said simulation process is based on a locality factor function (f(a)) that utilizes a leave probability (p1a), an average value of think time (ma) and variance of think time (s2a);
counting an actual hit ratio (ractual) for said group of data reading sessions; and obtaining a locality factor for said group of data reading sessions based on a relationship between said simulated hit ratio and said actual hit ratio.

15. A method according to claim 14, wherein said locality factor comprises how many data reading sessions are consecutively called for in one Web page transmission request.

16. A method according to claim 14, wherein said simulation is performed using an initial locality factor (a) and said obtaining process produces a new locality factor (anew) that replaces said initial locality factor.

17. A method according to claim 14, wherein said leave probability comprises a reciprocal of an average value of the number of data reading sessions per session, and said think time comprises a time interval between data session readings adjacent to each other in a time axis direction within the same session.

18. A method according to claim 14, wherein said locality factor comprises an average of locality factors of all data reading sessions in said group of data reading sessions.

* * * * *